Dec. 19, 1961  B. B. WOERTZ  3,014,082
METHOD AND APPARATUS FOR PURIFYING AND DEHYDRATING
NATURAL GAS STREAMS
Filed Dec. 23, 1959
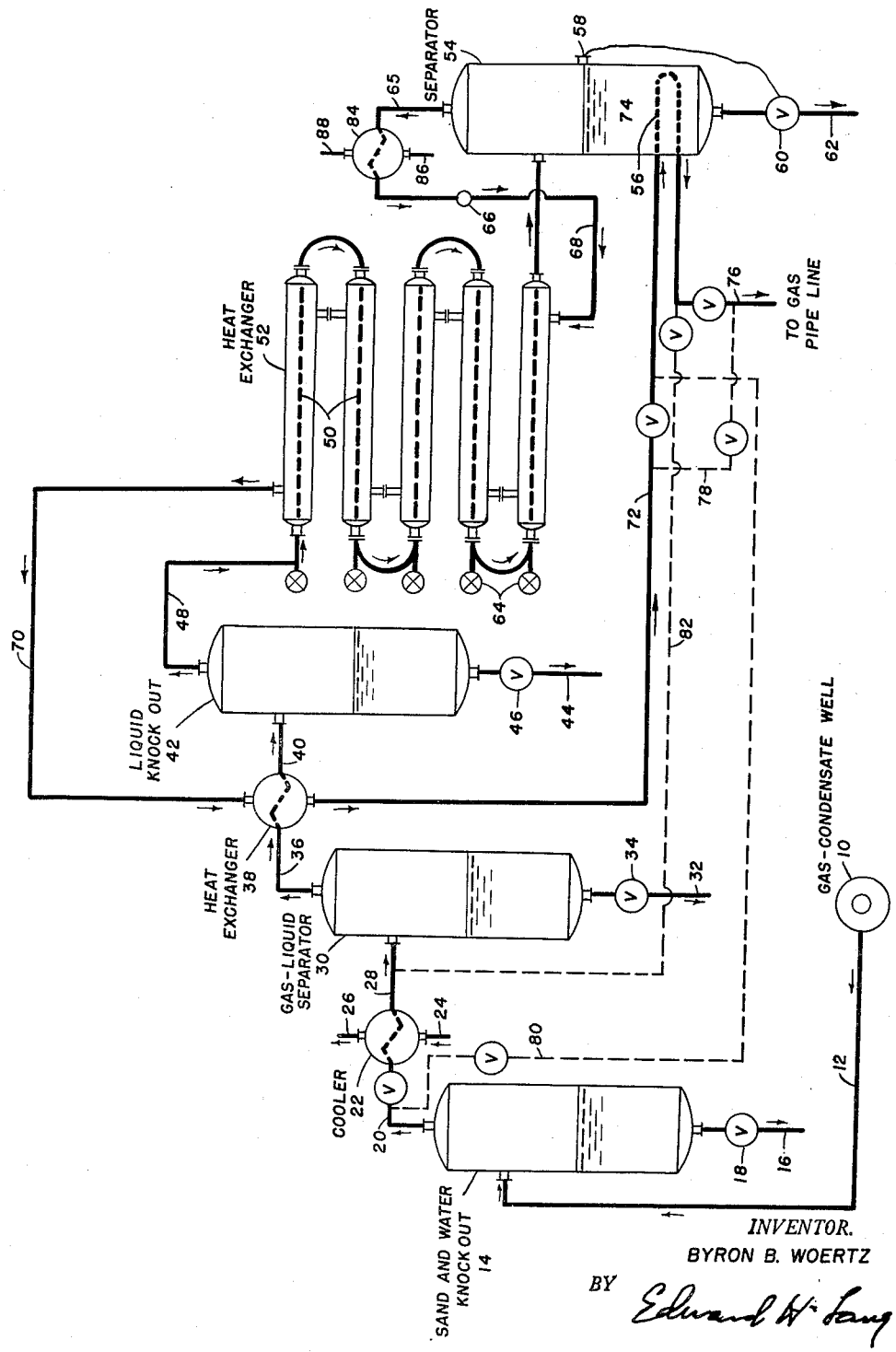
INVENTOR.
BYRON B. WOERTZ
BY
ATTORNEY

3,014,082
METHOD AND APPARATUS FOR PURIFYING AND DEHYDRATING NATURAL GAS STREAMS

Byron B. Woertz, Crystal Lake, Ill., assignor to The Pure Oil Company, Chicago, Ill., a corporation of Ohio
Filed Dec. 23, 1959, Ser. No. 861,603
9 Claims. (Cl. 260—676)

This invention relates to new and improved methods and means for separating hydrocarbon liquids and water from high-pressure, natural-gas streams.

In high-pressure gas wells where the hydrocarbon liquids, or condensate, and water are present in the flow stream as a vapor phase under the high well pressures and temperatures, the flow stream has the gas therein saturated with water vapor originating from the connat water in the formation. If subsurface formation pressure and temperature could be maintained, there would ordinarily be substantially no condensation of hydrocarbon liquid or water in the flow line. However, as the gas flows upward towards the surface of the earth, a pressure and temperature drop occurs with the result that condensation takes place and hydrocarbon components as well as free water are formed in liquid phase in the flow line.

It is well known that a pressure reduction in high-pressure gas streams increases the water-vapor carrying capacity of the gas, while a reduction in temperature has the effect of decreasing the water-vapor carrying capacity of the gas. In a typical high-pressure gas well the temperature-reduction effect is greater than the effect of pressure drop with the result that as the pressure and temperature are reduced, condensation of water occurs. When a high-pressure gas stream is passed through the usual control devices from the high-pressure region or zone of a well to the comparatively low-pressure zone in a pipeline, the pressure reduction results in extreme cooling due to the expansion of the gas. This cooling, which may occur as the gas stream is taken through a pressure-reducing choke or regulator, may cause the formation of hydrates which are solid hydrocarbon-water particles. The hydrates so formed tend to accumulate in the pipeline or associated apparatus, and may ultimately completely close the line or substantially reduce the flow therethrough.

The hydrate problems encountered in high-pressure gas lines are primarily due to the hydrocarbon hydrates, and obviously, if substantially all of the water is removed from the gas, these difficulties are overcome. Water must exist usually in a liquid state in order for hydrates to form, and thus if the gas is maintained above the dew point with no liquid water exsting in the gas stream, no hydrates will form. Various types of separators and means for water knockout have come into general use for separating the free water and solid particles from a high-pressure gas stream. Even though all free water is thus removed, the gas in the flow stream remains saturated with water vapor and gaseous hydrocarbons since the knockout means removes only free water and hydrocarbons which are liquid under the conditions existing in the knockout apparatus. Therefore, after passing through a separator or knockout apparatus the gas stream still contains water and hydrocarbons in the vapor phase, and upon a subsequent pressure reduction which causes further cooling of the gas, a further condensation may occur.

If the subsequent pressure reduction is sufficient to cause extreme cooling, hydrate particles can form in the stream and block the system beyond the point of pressure reduction. It becomes evident that if the water in the gas stream, which has been converted into the liquid phase and then solidified by the temperature reduction, is removed while the gas is still cold and at a temperature below the melting point of the hydrates, there will be no return of water as a vapor to the gas stream because at the lower temperature the vapor-carrying capacity of the gas is reduced. Further, if the cooling zone created by the pressure reduction is the coldest zone in the system and the removal of water is carried out in that zone, then subsequent increases in temperature of the gas stream without a change in pressure will cause the gas to be undersaturated, that is, it will have the capacity to carry more water vapor than is actually contained therein. These phenomena are utilized by the methods and apparatus of the prior art for reducing the water and/or liquefiable hydrocarbon content of a gas stream. The dehydration conventionally is accomplished by utilizing a low-temperature separator in combination with an expansion choke, and when the well-head pressure of the gas stream is relatively high, about 2,000 p.s.i. or higher, and the pipeline pressure is about 800 p.s.i. or less, this method is satisfactory. The gas is ordinarily cooled to about the temperature at which hydrates form and then passed through a choke and further cooled as a result of Joule-Thomson effect from the expanding gas, whereupon the water in the gas forms a solid hydrate precipitate which collects in the bottom of the separator. There, the hydrate is broken down into hydrocarbon and water, which are withdrawn and separated.

As explained above, when a pressure and temperature reduction occurs in the gas stream flowing from a typical high-pressure gas well, the temperature effect is greater than the pressure-reduction effect so that condensation of the water takes place; conversely, when the pressure and temperature of the gas is increased, as by adiabatic compression, the temperature effect is still dominant and vaporization of water occurs if any free water is present in the gas stream. The prior art techniques of dehydration by expansion of the gas on passing through a choke are based upon the principle that while the reduction in pressure increases the water vapor carrying capacity of the gas stream, the accompanying decrease in temperature has a still greater effect in decreasing the water-carrying capacity of the gas stream. The net effect is that water vapor is condensed and removed as free water, or as a hydrocarbon-water hydrate, depending upon the extent to which temperature and pressure are reduced by the expansion process.

This technique works adequately where the initial pressure of the gas is greater than about 2,000 p.s.i., and the gas is expanded through the choke to a pipeline pressure which usually is about 800 p.s.i. or lower. When the initial pressure is considerably less than about 2,000 p.s.i., there is not sufficient Joule-Thomson cooling at the choke to reduce the water content of the gas stream sufficiently for pipeline transmission. Normally, it is not possible to cool the gas before it reaches the choke to a temperature less than about 60–80° F., at which the hydrates will form at well-head pressure, because the heat exchanger which accomplishes this cooling plugs with hydrate. In such cases, it has been necessary to prevent hydrate formation in the exchanger by adding anti-freeze agents, such as glycols or alcohols, to the gas. When glycol anti-freeze agents are used, economics necessitates that they be recovered or regenerated, and re-used. This regeneration of the anti-freeze agent is expensive and sometimes hazardous, especially in off-shore operations where the use of furnaces to heat the mixture for separation is undesirable. Although alcohol anti-freezes can be used and are cheaper than glycols, they can not be recovered or regenerated economically because of their volatility characteristics. Thus their net cost may be prohibitive.

Now, in accordance with this invention, a new process has been devised whereby the dew point of a gas at relatively low initial pressure, that is, substantially below about 2,000 p.s.i., can be reduced to the low levels required for pipeline transmission without using anti-freeze agents and encountering the difficulties associated therewith. The method of this invention is based upon the principle of cooling the gas stream without substantially reducing the pressure thereof, so that the effects of temperature drop to reduce the water-vapor-carrying characteristics of the gas stream is not counteracted by the effects of pressure reduction to increase the water-vapor-carrying potential of the stream. Thus the desired amount of water can be removed from the gas stream as a hydrocarbon-water hydrate at substantially higher temperatures than would otherwise be possible. The Joule-Thomson cooling effect, obtainable by expanding the gas through a choke from an initial pressure as low as 1,500 p.s.i. to a pipeline pressure of 800 p.s.i., is sufficient to provide the cooling required to cool the gas stream and remove the undesired water content, where the pressure of the gas stream at the time of hydrate removal is substantially the initial pressure. Cooling of the gas stream prior to passage through the choke is accomplished by heat exchange between the gas stream saturated with water vapor and the product gas which has been passed through the expansion choke after the removal of hydrate therefrom.

It is an object of this invention to provide a cold, separation method for removing water vapor from natural gas streams normally containing water vapor, gaseous liquefiable hydrocarbons, and other components. It is another object of this invention to provide a cold separation method and apparatus for removing hydrates from a natural gas stream which does not necessitate the use of anti-freeze agents to permit the reduction of the water content of the gas to an acceptable level. It is another object of this invention to provide a method for reducing the water content of a natural gas stream to an acceptable value, while maintaining the final pressure of the product gas at the highest possible level. It is another object of this invention to provide a method for dehydrating a gas without the use of an open flame in the vicinity of the dehydrating apparatus.

This invention is best described by reference to the drawing, which depicts schematically the apparatus of this invention. Gas from gas or gas-condensate well 10 flows through line 12 to sand-and-water knockout 14. Sand, condensate, and water are withdrawn from the bottom of knockout 14 through line 16, which line is controlled by a valve 18. Uncondensed gas and water vapor are withdrawn as overhead from knockout 14 through line 20 to cooler 22 where the gas stream is partially cooled by heat exchange with water entering through line 24 and leaving through line 26. The partially-cooled gas stream passes from cooler 22 through line 28 to gas-liquid separator 30, wherein additional condensed water and hydrocarbon condensate is removed from the gas stream and withdrawn through line 32, controlled by valve 34. The gas stream from separator 30 flows through line 36 to heat exchanger 38, wherein the stream is further cooled by heat exchange with product gas, and from which the stream flows through line 40 to liquid knockout 42. Water and condensate are withdrawn from knockout 42 through line 44, controlled by valve 46. The gas stream from knockout 42 flows through line 48 and through tubes 50 of straight, hairpin-type, heat exchanger 52. Effluent from tubes 50 passes to hydrate separator 54, where the hydrates fall to the bottom and are melted by low-pressure, product gas in coil 56. Separator 54 is equipped with level controller 58 and control valve 60 for withdrawing water and hydrocarbons through line 62. Scrapers 64 continuously remove hydrate from the inside of tubes 50 of heat exchanger 52. Gas velocity is maintained sufficient to blow the mixture including the scraped hydrate solids into separator 54.

The hydrate-free gas flows from the vapor section of separator 54 through line 65 to throttling choke 66, which is preferably a conventional low-temperature separation unit, where the hydrate-free product gas is expanded causing a substantial pressure reduction and chilling of the expanded gas. The expanded, chilled gas from throttling choke 66 flows through line 68, the shell side of heat exchanger 52, and on through line 70 to heat exchanger 38. The expanded product gas flowing through heat exchanger 38 cools the incoming partially-cooled gas from line 36, which then flows on through line 40 to separator 42. The partially-warmed, product gas flows from exchanger 38 through line 72 and on through tube bundle 56 in section 74 of separator 54. In section 74, the partially-warmed product gases heat solid hydrates scraped from tubes 50 in exchanger 52 and melt them, causing a separation of condensed water and condensed or vaporized hydrocarbon. These two fluid phases may be withdrawn through separate drain lines, or as shown, through common line 62 to a liquid-liquid separator, not shown. The warm gases from tube bundle 56 flow through line 76 to the gas-transmission pipeline.

In some cases difficulty may be encountered in melting the hydrate in hydrate separator 54 by heat exchange with product gas. In such cases it may be preferred to flow the product gas from heat exchanger 38 directly to the transmission pipeline through valve-controlled line 78, in which case part of the raw gas from knockout 14 may be passed through valve-controlled line 80 and tube bundle 56 to partially cool the raw gas and completely melt the hydrates. This gas then returns to separator 30 through line 82. The choice between these alternative methods is controlled by the quantity of hydrate to be melted and the temperature of the raw gas leaving knockout 14. The flow path of the alternate system is represented by dotted lines.

Condensate and water from knockout 14, separator 30, knockout 42, and zone 74 of hydrate separator 54, preferably are combined and transferred to a liquid-liquid separator from which the hydrocarbon phase is withdrawn for use or sale, and the water phase is withdrawn and discarded. Heat exchanger 52 is provided with flexing or scraping means 64 to remove the cake of hydrates. Preferably, continuously vibrating, flexing, or scraping means are provided to cause the solid hydrates to be parted from the heat exchangers surfaces continually. When such provision is made, the process can be operated in a substantially continuous manner.

In the preferred embodiment of this invention, heat exchanger 52 is made up of double-pipe heat exchangers having internally rotating scrapers. Exchangers of this type are available commercially from heat-exchange equipment manufacturers and are described in U.S. Patents 1,920,570; 2,344,606; and 2,405,944. When these scraper-heat exchangers are used, the moisture-containing gas is passed through the tubes of the exchanger, expanded and chilled, and the chilled gas is then passed through the shell side of the scraper-heat exchanger. The solid hydrates are scraped from the tubes of the exchanger and are carried into a hydrate separator, as shown in the drawing. In embodiments of this invention wherein hydrates are formed on the outside surface of the exchanger tubes, from wet gas on the shell side of the exchanger, scraping or flexing arrangements are required on the outside of the tubes. In such cases, hydrate separator 54 and exchanger 52 may be combined in a reboiler-type vessel, but in this case procurement of true counter-current flow of streams exchanging heat in exchanger 52 may be difficult to achieve.

It is preferred that the scraped solid hydrates be entrained in the moving gas stream and thus carried to the hydrate separator. To insure satisfactory entrainment of the scraped particles, continual scraping is required so that a reasonably small particle size is maintained. It is further necessary that the gas flow rate be maintained at a high level. Alternatively, the heat-exchange tubes in the scraper cooler may be mounted vertically so that the hydrate will fall by force of gravity into the hydrate-separating vessel.

As a specific example of this invention, the apparatus depicted in FIGURE 1 is assembled and natural gas containing solid impurities, and saturated with water vapor and low-boiling hydrocarbons, enters line 12 at a pressure of 1,500 p.s.i. and a temperature of 130° F. The gas flows through knockout 14 in which free liquids and solids are separated from the gas stream, which then flows to cooler 22 wherein the gas stream is cooled to 100° F. by heat exchange with water at ambient temperature conditions. The gas stream then flows to knockout 30 where additional quantities of condensed liquids are removed, and then to heat exchanger 38 where the gas stream is cooled by indirect heat exchange with product gas to a temperature of 70° F. The temperature of the gas stream on leaving cooler 38 is just above the temperature at which hydrates will form at the 1,500 p.s.i. pressure. The gas stream is then passed through knockout 42 wherein additional quantities of condensed liquids are removed, and the gas stream is passed to scraper-heat exchanger 52 and enters the scraper-heat exchanger at a temperature of 70° F. The pressure in the scraper cooler is maintained at 1,500 p.s.i., or slightly lower than this pressure, allowing for a pressure drop of perhaps 10 p.s.i. in the flow lines and equipment ahead of the scraper-heat exchanger. Here the gas stream is cooled by indirect heat exchange with cold product gas to a temperature of 48° F., hydrate solids are formed on the cold surface of the heat exchanger and scraped therefrom by the scraper element. A flow rate of about 100 feet per second is maintained in the scraper-heat exchanger, and the gas stream and entrained hydrate solids flow from the scraper-heat exchanger to the gas-hydrate separator wherein the product gas and hydrate solids are separated. The product gas is removed as an overhead from the separation vessel and is passed through expansion choke 66. Pressure at the high-pressure side of the expansion choke is very nearly 1,500 p.s.i., and the temperature is 58° F., the temperature rise from 48° F. to 58° F. in line 65 being caused by heat exchange from the atmosphere while the gas is in hydrate separator 54 and in the flow lines associated therewith. However, when a low-temperature separator unit, known in the trade as an "LTX" unit, is used, the gas may be as cold as 48° F. when it enters the choke. On the downstream side of choke 66 the pressure of the product gas is 800 p.s.i. and the temperature is 25° F. Thus a pressure drop of 700 p.s.i. and a temperature drop of 33° F. is encountered as the gas flows through the choke and is expanded. No additional hydrate is formed at the choke. While the product gas is substantially saturated with water at 1,500 p.s.i. and 48° F., the temperature rise at constant pressure to 58° F. leaves the product gas substantially below saturated conditions on entering the choke. While as aforeexplained, the effects of the temperature drop accompanying expansion through the choke substantially reduces the hydrate-carrying capacity of the product gas, the pressure drop tends to mitigate this effect by increasing the water-vapor-carrying capacity of the gas. If the gas stream were saturated, or substantially saturated with water vapor on entering the expansion choke, the product gas would be in a supersaturated condition following the expansion, and solid hydrates would be formed. The temperature rise of 10° at constant pressure is sufficient to leave the product gas sufficiently low in water vapor content and high enough in temperature so that expansion through the choke to a pressure of 800 p.s.i. restores the gas to a substantially saturated state, but does not cause the formation of hydrates except perhaps in very small amounts. Where ambient temperature conditions are such that this 10° rise in temperature does not occur naturally, heat exchanger 84 may be placed in line 65, and the gas warmed by indirect exchange of heat from water entering through line 86 and leaving through line 88. However, as mentioned above, this warming is not essential when units such as those known in the trade as "LTX" units are used in place of a simple conventional choke. The saturated expanded gas at 800 p.s.i. and 25° F. is then passed through scraper-heat exchanger 52 wherein the gas is warmed to 45° at constant pressure. The gas stream then flows to heat exchanger 38 wherein it is again warmed by heat exchange with the raw gas stream to about 70° F. The product gas at 70° F. flows through heat exchanger 56, melts the solid hydrates particles, leaves the heat exchanger at 60° F., and enters the gas-transmission line at substantially 800 p.s.i. and 61° F. The product gas under these conditions contains about 6 pounds of water per million standard cubic feet, which quantity of water meets most gas specifications.

The embodiments of the invention in which an exclusive property or privilege is claimed are defined as follows:

1. A method of purifying and dehydrating a natural-gas stream comprising separating and removing the free liquid and solid content of said gas stream, cooling said gas stream to a temperature slightly in excess of that at which hydrates will initially form in said gas stream, separating and removing additional quantities of condensed liquids from said gas stream, flowing said gas stream through a heat exchanger and therein cooling the gas to a temperature substantially below the temperature at which hydrates form by indirect heat exchange with cold, dehydrated product gas, continually scraping the gas-stream cooling surface of said heat exchanger to separate solid hydrates therefrom, separating and removing said solid hydrates from the gas stream to produce a substantially hydrate-free product gas of reduced water vapor content, warming said separated product gas, expanding the product gas to reduce the pressure and temperature thereof and flowing said cooled product gas through said scraper-heat exchanger to absorb heat therefrom.

2. A method of purifying and dehydrating a natural-gas stream comprising flowing said gas stream through a liquid knockout to recover the liquid and solid content thereof, cooling said gas by heat exchange with a cooling fluid to a temperature slightly above the temperature at which hydrates initially form in said gas stream, flowing said gas stream through a second knockout to remove condensed liquids therefrom, flowing said gas stream through a scraper-heat exchanger to cool said gas stream to a temperature substantially below the temperature at which hydrates form by indirect heat exchange with cold, dehydrated product gas, continually scraping the gas stream-cooling surface of said heat exchanger to separate solid hydrates therefrom, the velocity of said gas stream through said scraper-heat exchanger being maintained sufficiently high to entrain said solid hydrates therein, flowing said gas stream and entrained solid hydrates into a separation vessel and therein separating the solid hydrates from the gas stream to produce a substantially hydrate-free gas product of reduced water vapor content, warming said separated product gas, expanding the product gas to reduce the pressure and temperature thereof and flowing said cooled product gas through said scraper-heat exchanger to absorb heat therefrom.

3. A method according to claim 2 in which the product gas effluent from the scraper-heat exchanger is the cooling fluid used to cool said gas stream to a temperature slightly above the temperature at which hydrate forms in said gas stream.

4. A method according to claim 3 in which said product-gas, effluent-cooling fluid is passed in heat exchange relationship with the solid hydrates separated from said gas stream to melt the solid hydrates.

5. A method in accordance with claim 2 in which the initial pressure of said gas stream is not greater than about 2,000 p.s.i.

6. A method according to claim 5 in which the initial pressure of said gas stream is about 1,500 p.s.i., the pressure of said product after expansion is about 800 p.s.i., and the temperature drop of said gas stream in said scraper-heat exchanger is about 22° F.

7. An apparatus for purifying and dehydrating a natural-gas stream comprising a liquid knockout unit for removing free liquids and solids from the gas stream as the gas stream is conducted therethrough, a heat exchanger for cooling said gas stream to a temperature not lower than that at which hydrates form in the gas stream by heat exchange with a cold fluid, a second liquid knockout unit for removing free liquids condensed by the cooling in said heat exchanger, a scraper-heat exchanger for cooling said gas stream to a temperature substantially below that at which hydrates form, said scraper-heat exchanger including means for removing solid hydrates from the gas stream-heat exchange surface of said scraper-heat exchanger, a solid-hydrates separator for removing solid hydrates from said gas stream to produce hydrate-free product gas as said gas is conducted therethrough, means for warming said product gas, choke means for expanding said product gas to decrease the temperature and pressure thereof, all the aforementioned elements being serially connected in the order stated for the flow of said gas therethrough, and means for conducting said product gas from said choke means to said scraper-heat exchanger for flow therethrough to receive heat therefrom.

8. An apparatus according to claim 7 including means for conveying product-gas effluent from said scraper-heat exchanger to said first-mentioned heat exchanger for flow therethrough to receive heat therefrom.

9. An apparatus according to claim 7 including heat-exchange means in said solid-hydrates separator for melting the solid hydrates accumulated therein, and means for conveying product gas from said first-mentioned heat exchanger to said solid-hydrates separator heat-exchanger means for flow therethrough to melt said solid hydrates and cool said product gas.

References Cited in the file of this patent
UNITED STATES PATENTS

| | | |
|---|---|---|
| 2,399,723 | Crowther | May 7, 1946 |
| 2,866,834 | Donnelly | Dec. 30, 1958 |
| 2,873,814 | Maher | Feb. 17, 1959 |